Patented Sept. 2, 1952

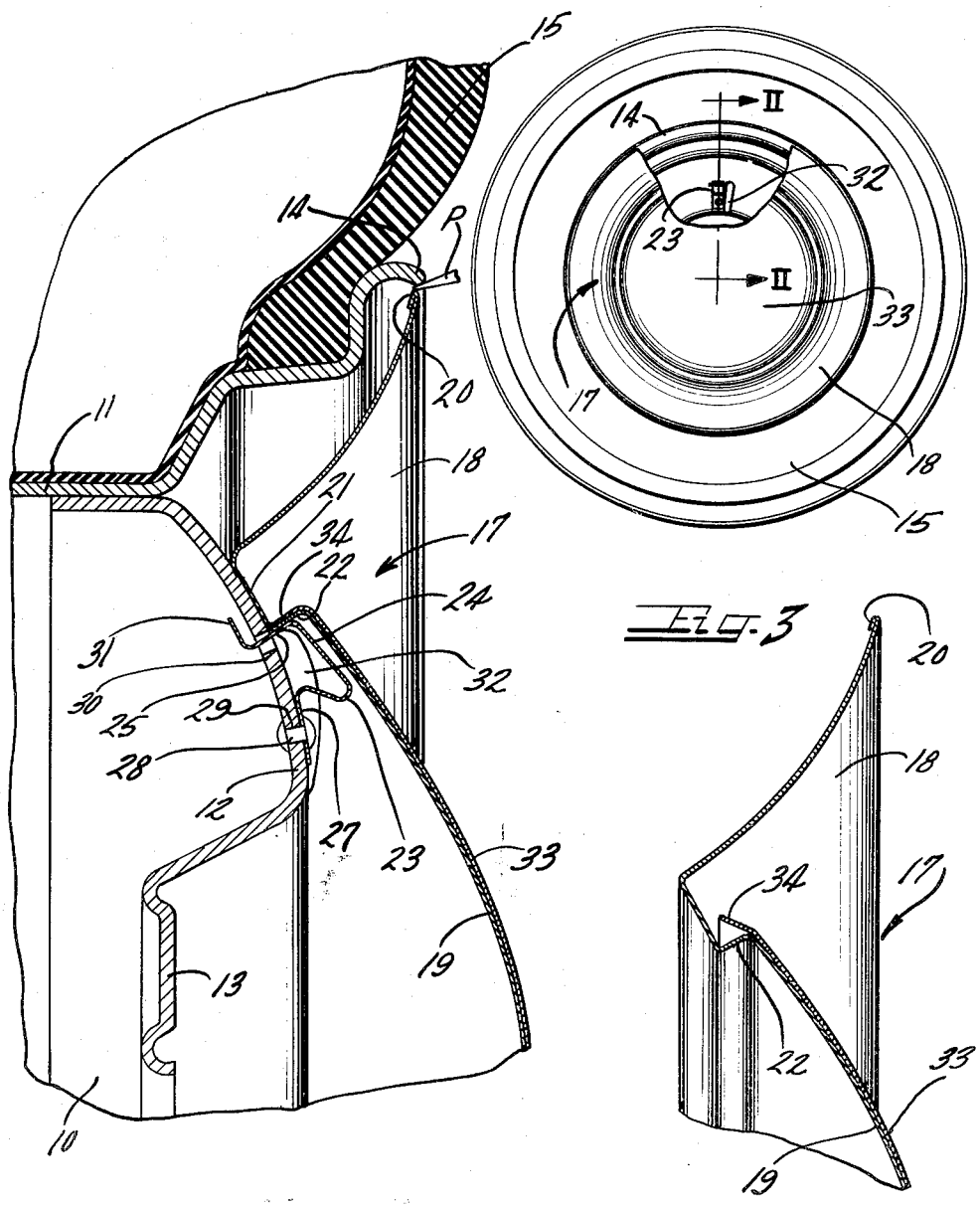

2,609,246

UNITED STATES PATENT OFFICE 2,609,246

WHEEL COVER

George Albert Lyon, Detroit, Mich.

Application April 1, 1947, Serial No. 738,512

1 Claim. (Cl. 301—37)

This invention relates to an improved wheel structure and more particularly to a vehicle wheel having a removable ornamental and protective cover for the outer side thereof.

An important object of the present invention is to provide in a vehicle wheel structure improved means for retaining an ornamental and protective cover in place thereon.

Another object of the invention is to provide an improved one-piece cover for a vehicle wheel.

A further object of the invention is to provide an improved vehicle wheel and cover combination wherein a one-piece cover, which substantially entirely covers the outer side of the wheel, is adapted to be mounted on the wheel in readily detachable relation in an improved manner.

Other objects, features and advantages of the invention will be readily apparent from the following detailed description of a preferred embodiment thereof taken in conjunction with the accompanying drawings, in which:

Figure 1 is a side elevational view of a wheel structure embodying features of the invention with a portion of the cover applied thereto broken away to reveal details of structure therebehind;

Figure 2 is a radial sectional view taken substantially on the line II—II of Figure 1 and on an enlarged scale; and Figure 3 is a radial sectional view taken substantially on the same plane as Figure 2 but showing only the cover with a portion of the cover in a state of partial assembly.

As shown on the drawings:

A wheel embodying the features of the invention comprises a wheel body 10 and a tire rim 11. Both the wheel body and the tire rim may be formed from suitable gauge sheet metal, the wheel body formed as a stamping, and the tire rim as a rolled section.

The wheel body is formed with an annular reinforcing nose bulge 12 which defines a central bolt-on flange portion 13 adapted to be secured by means of cap screws or bolts to a portion of a vehicle axle (not shown). At its outer margin the wheel body 10 is secured to the base flange of the tire rim in a well known manner.

The tire rim 11 may be formed in the usual drop center, stepped flanged fashion and has a generally axially outwardly extending terminal flange 14. The tire rim is adapted to receive a pneumatic tire and tube assembly 15.

For concealing the outer side of the wheel, a cover 17 is provided which by preference comprises a one piece construction including a tire-rim-concealing portion 18 and a hub-cap-simulating portion 19. The cover is adapted to be made from suitable gauge sheet metal, the tire-rim-concealing portion 18 being formed in the nature of a trim ring of generally convex cross section in simulating the tire side wall curvature, and, where colored white, appearing in use as a side wall portion of a massive tire on the wheel.

At its outer edge the cover portion 18 is preferably turned upon itself as shown at 20 for reinforcement. The diameter of the outer edge of the cover is preferably slightly less than the extremity diameter of the tire rim terminal flange 14. Thus, by having the marginal extremity of the cover lying within the plane of the edge of the terminal flange 14, the cover margin is protected against damage should the wheel be run against a curb or the like. Furthermore, the edge of the terminal flange 14 provides a convenient fulcrum for a pry-off tool P inserted between the edge of the cover and the terminal flange when it is desired to pry the cover off of the wheel.

At the juncture of the cover portions 18 and 19, is preferably formed an annular seating area 21. This area 21 extends generally obliquely complementary to the adjacent or opposing radially outer side of the nose bulge 12 and seats full thereagainst.

The hub cap portion 19 joins the seating area 21 through the medium of a generally radially and axially outwardly extending flange 22 which provides a shoulder for retaining engagement with a series of spring clips 23 mounted on the wheel nose portion 12 and concealed behind the cover portion 19. There may be any suitable number of the clips 23 such as four or five as desired.

Each of the clips 23 comprises a goose-neck head 24 formed with a retaining shoulder flange portion 25 and integrally and resiliently connected with a base flange 27 which is secured to the nose portion 12 by means of a rivet 28 extending through an aperture 29 in the nose portion.

The clips extend generally radially outwardly and have the retaining shoulder flange portions 25 thereof extending generally axially rearwardly through clearance apertures 30 formed in the nose portion. In order to limit the clips in their outward flexure, the retaining flange portions 25 are formed with generally radially outwardly extending stop terminals 31 adapted to engage the rear side of the nose portion of the body.

The normal circle defined by the retaining flanges of the clips 30 is preferably slightly greater than the internal diameter of the shoulder flange 22 of the cover. Therefore, when the cover is pressed axially inwardly against the clips, the clips snap into retaining engagement with the shoulder 22 of the cover.

In order to maintain the cover concentric on the wheel and reinforce the nose bulge portion 12 and especially adjacent to and with respect to the areas thereof which are formed with the apertures 29 and 30, the nose portion 12 is formed with generally radially extending reinforcing ribs 32. This is desirable since the nose portion 12 is subjected to the greatest stress in the use of the wheel.

The ribs 32 are disposed as close to the respective sets of apertures 29, 30 with which they are associated as practicable and yet allow clearance for the respective retaining clips 23.

The circle defined by the radially outer ends of the ribs 32 is such as just to clear the radially innermost portion of the retaining shoulder 22 of the cover and maintain the cover concentric when in place on the wheel, especially against transverse force thereagainst.

In order to enable the cover 17 proper to be made from a relatively inexpensive sheet metal which may lend itself well to finishing by painting or enameling, but which may not be readily susceptible of a natural polished finish or plating, and yet secure the decorative advantages of a brightly polished or otherwise decorated hub cap cover portion, the hub cap portion 19 of the cover may be provided with a thin covering 33 of sheet metal, plastic material, or the like, which of itself may be susceptible of receiving a high polish or which may be readily plated to receive a high polish, or may be of an inherent color. For example, the covering 33 may be sheet aluminum, stainless steel, plated brass, or the like. Since the cover itself is of relatively stiff material, the covering 33 may be of very thin stock providing merely a skin-like layer over the outside of the hub cap cover portion 19.

A convenient manner of applying the decorative covering 33 is to form the same initially to the general contour of the hub cap cover portion 19 and of a diameter to extend beyond the diameter of the cover portion proper so that the margin of the covering layer 33 can be crimped or spun under to lap against the radially outer side of the shoulder flange 22 from the extending position as indicated in Figure 3 to the fully engaging, retained position as shown in Figure 2. Then the margin of the facing sheet 33, identified at 34, is turned radially inwardly and under the annular protrusion afforded by the juncture of the hub cap cover portion 19 with the flange 22. Considered in another way, the margin of the facing sheet 33 is bent down into the generally axially outwardly opening groove afforded by the inset seating portion 21 of the cover and against the retaining shoulder provided by the flange 22 which defines the radially inner side of the groove.

If preferred, of course, the facing sheet 33 may be a suitable plastic to afford any desired color effect or it may be any other preferred material to afford the desired decoration of the cover. On the other hand, it is clear that the facing sheet 33 might be omitted if it is desired to utilize the hub cap cover portion 19 in an uncovered condition, either decorated or, where the material is susceptible, thereof polished.

From the foregoing it will be clear that the present invention affords a wheel and cover combination which is highly advantageous, especially for the relatively small size wheels which are currently popular. Although the wheel body is apertured in what is probably its most vital area from the standpoint of strain and stress in use, any potential weakening is balanced and probably more than compensated for by the reinforcing ribs 32 which are strategically disposed to afford maximum reinforcement.

Furthermore, the reinforcing ribs have the additional and important function of maintaining the cover 17 in centered relation on the wheel. This is a valuable feature when it is considered that a wheel cover of this nature is subject to relatively violent transverse displacing forces when the wheel is driven against obstructions which may come in contact with the hub cap portion 19 of the cover. In such event, the resilient spring clips are liable to yield and allow the cover to be forced or popped off. On the other hand, the ends of the reinforcing ribs 32 leave the cover free for convenient snap-on, pry-off engagement with the retaining clips 23.

It is also to be noted that the cover is especially free from curbing damage since the tire rim covering portion 18 of the cover is fully protected by the edge of the tire rim. Any pressure that may be applied axially inwardly against the tire rim covering portion 18 is freely resisted resiliently by the cover portion 18, within certain limits, since the outer edge is entirely free to yield in an axial direction. Yet the outer cover member 18, due to its convex contour and the reinforcement afforded by the angularly disposed seating portion 21 at its inner margin, is thoroughly reinforced. This reinforcement is also of distinct advantage for resisting pry-off distortion. Furthermore, the marginal reinforcement afforded for the hub cap cover portion 19 by the toed-in angularity of the flange 22 and the angular relation thereto of the seating portion 21 effectively rigidifies the margin of the hub cap cover portion. The outwardly bowed structure of the hub cap cover portion is best designed to resist ordinary axially inward pressures thereon resiliently and without permanent distortion.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In a wheel structure including a multi-flange tire rim and a wheel body including an annular reinforcing nose bulge and secured to the base flange of the tire rim and defining with the axially outer flanges of the tire rim a relatively deep annular axially outwardly opening groove at the radially outer-side of which the axially outwardly extending terminal flange of the tire rim provides a boundary rim for the groove, a one-piece sheet metal cover comprising a trim ring portion and a hub cap simulating portion and an intermediate annular reinforcing and attachment rib integrally joining the portions of the cover in one piece, said intermediate attachment rib comprising an annular seating area generally obliquely complementary to the adjacent opposing radially outer side of the nose bulge and seating fully thereagainst and a generally radially and axially outwardly extending flange at the radially inner edge of said seating area and providing at the radially inner side thereof a shoulder engageable by spring clips and cover centering means on said nose portion of the wheel body, the trim ring portion extending from the radially outer edge of said seating area on a convex curvature generally radially and axially outwardly in completely spaced relation to the tire rim and having its radially outer margin aligned with the radial plane of the tire rim terminal flange extremity and having a marginal underturned reinforcing flange with the juncture of the reinforcing flange with the remainder of the trim ring portion providing the edge extremity of the trim ring portion and lying in slightly spaced relation radially inwardly from the tire rim terminal flange for reception of a pry-off tool between said edge and the terminal flange, the radially outer margin of the trim ring portion and the terminal flange of the tire rim affording a pocket in the space therebetween, and the extremity of the terminal flange of the tire rim protecting said edge against curbing damage and the like while affording a convenient fulcrum for the pry-off tool, said intermediate attachment rib strongly reinforcing the inner margin of the trim ring to withstand pry-off force without damage.

GEORGE ALBERT LYON.

REFERENCES CITED

The following references are of record in the file of this patent:

UNITED STATES PATENTS

| Number | Name | Date |
|---|---|---|
| Re. 22,120 | Lyon | June 16, 1942 |
| 2,109,671 | Lyon | Mar. 1, 1938 |
| 2,196,718 | Ash | Apr. 9, 1940 |
| 2,308,617 | Lyon | Jan. 19, 1943 |
| 2,368,254 | Lyon | Jan. 30, 1945 |
| 2,397,360 | Lyon | Mar. 26, 1946 |